United States Patent

Kalsi

Patent Number: 5,862,861
Date of Patent: Jan. 26, 1999

[54] PLUG APPARATUS SUITABLE FOR SEALING HOLES OF VARIABLE OR ROUGHENED DIAMETER

[76] Inventor: Manmohan S. Kalsi, 13307 Carousel Ct., Houston, Tex. 77041

[21] Appl. No.: 747,810

[22] Filed: Nov. 14, 1996

Related U.S. Application Data

[60] Provisional application No. 60/006,687, Nov. 14, 1995.
[51] Int. Cl.$^6$ ..................................................... E21B 33/13
[52] U.S. Cl. ............................ 166/277; 166/192; 166/387
[58] Field of Search ...................... 166/277, 387, 166/135, 192, 316, 243, 284, 75.13; 138/89, 94, 94.3

[56] References Cited

U.S. PATENT DOCUMENTS

| | | | |
|---|---|---|---|
| 1,657,751 | 1/1928 | Henderson | 166/182 |
| 1,822,444 | 9/1931 | MacClatchie | 285/425 |
| 2,170,866 | 8/1939 | McAllister | 220/233 |
| 2,262,117 | 11/1941 | Roe | 166/13 |
| 2,725,283 | 11/1955 | Mounce et al. | 23/253 |
| 3,287,920 | 11/1966 | Oitto, Jr. | 405/303 |
| 3,301,337 | 1/1967 | Vaughn et al. | 175/22 |
| 3,507,340 | 4/1970 | Voetter | 175/4.52 |
| 4,007,905 | 2/1977 | Mott | 251/1 R |
| 4,339,948 | 7/1982 | Hallmark | 73/155 |
| 4,424,865 | 1/1984 | Payton, Jr. | 166/302 |
| 4,742,459 | 5/1988 | Lasseter | 364/422 |
| 4,830,107 | 5/1989 | Rumbaugh | 166/250 |
| 4,869,321 | 9/1989 | Hamilton | 166/277 |
| 4,878,538 | 11/1989 | Christensen | 166/264 |
| 4,883,123 | 11/1989 | Zunkel et al. | 166/264 |
| 4,942,923 | 7/1990 | Geeting | 166/250 |
| 5,056,595 | 10/1991 | Desbrandes | 166/100 |
| 5,065,619 | 11/1991 | Myska | 73/152 |
| 5,195,588 | 3/1993 | Dave | 166/255 |
| 5,293,934 | 3/1994 | Burge et al. | 166/202 |
| 5,375,659 | 12/1994 | Gilbert et al. | 166/264 |

*Primary Examiner*—Hoang C. Dang

[57] ABSTRACT

An apparatus for sealing non-regular holes in a perforation in a wall, including a sealing member configured to be forcibly pressed into an inner surface of the perforation, an expandable member for forcing the sealing member against the inner surface of the perforation, and an expander member for causing the expandable member to force the sealing member against the inner surface of the perforation.

14 Claims, 3 Drawing Sheets

PLUG APPARATUS SUITABLE FOR SEALING HOLES OF VARIABLE OR ROUGHENED DIAMETER

This application depends from provisional application Ser. No. 60/006,687, filed Nov. 14, 1995, titled Plug Apparatus Suitable for Sealing Holes of Variable or Roughened Diameter.

BACKGROUND OF THE INVENTION

1. Field of the Invention

The present invention relates to plugs for the sealing of holes, in particular loosely toleranced holes, such as the perforations produced through the wall(s) of oilfield hole casings to sample reservoir fluid and to measure formation pressures.

2. The Prior Art

It is common, in oilfields, for the hole casings to be perforated, through the side of the casing, for purposes of sampling the fluid in the oilfield reservoir, and for determining the pressure in the oilfield formation. Once the sample has been taken, in order to restore the casing to utility for drilling or pumping purposes, the perforations must be closed. While efforts may be made to produce uniform perforations, so that they may be more easily closed, typically, the perforation will have a non-uniform circumferential contour, or the circumferential edge of the perforation may otherwise be rough.

Prior art apparatus for plugging such perforations are illustrated in Roe, U.S. Pat. No. 2,262,117; Mott, U.S. Pat. No. 4,007,905; Payton, U.S. Pat. No. 4,424,865; Geeting, U.S. Pat. No. 4,942,923; and Dave, U.S. Pat. No. 5,195,588.

It would be desirable to provide an apparatus and method for plugging such hole casings which would be capable of accommodating non-uniform or roughened perforations.

SUMMARY OF THE INVENTION

The present invention is directed to an apparatus for closing a non-regular, generally cylindrical hole in a wall, the hole having a longitudinal axis and a first end and a second end, the apparatus comprising means for sealably filling surface irregularities along at least a portion of the inner circumferential surface of a hole in a wall. The sealing means has a first end and a second end.

The sealing means may be still further operably configured so as to be disposed within the hole such that the first end of the sealing means is disposed substantially adjacent the first end of the hole. Expandable means are provided for forcing the sealing means against the inner circumferential surface of the hole, the expandable means being operably configured to exert force radially against the sealing means. The expandable means further may be operably configured to provide reinforcement of the sealing means for facilitating resistance to movement of the sealing means against differential pressure across the wall which would tend to cause ejection of the apparatus from the hole.

Expander means are provided for actuating the expandable means, the expander means being operably associated with the expandable means, for selective actuation of the expandable means, following preliminary insertion of the apparatus into the hole to be closed. The expandable means and the expander means are operably associated so as to cause substantially radially directed sealing force to be exerted against the sealing means.

In a preferred embodiment of the invention, the sealing means comprise a substantially cylindrical, generally tubular member, operably configured to be pressable, in at least a fluid-tight sealing manner, radially against the inner circumferential surface of a generally cylindrical hole.

In one embodiment of the invention, the expandable means comprise at least one expandable member operably disposed such that a portion of the substantially cylindrical member is positioned radially between a portion of the inner circumferential surface of the hole and the expandable member. The at least one expandable member further extends from a position substantially adjacent the first end of the sealing member, toward the second end of the sealing member, the at least one expandable member being operably configured such that upon the exertion of radially directed force upon the at least one expandable member, a portion of the at least one expandable member is caused to move radially outwardly, to, in turn, exert radially directed force against at least a portion of the sealing member against the inner circumferential surface of the hole.

The at least one expandable member preferably comprises a plurality of expandable members operably disposed such that a portion of the substantially cylindrical member is positioned radially between a portion of the inner circumferential surface of the hole and the expandable members.

The at least one expandable member preferably has a first end which is configured to be disposed substantially adjacent the respective first ends of the sealing member and of the hole, and a second end disposed at a position axially removed from the first end, toward the second end of the sealing member.

The expander means comprises an expander member, operably configured to be forcibly inserted into the substantially cylindrical member, such that the at least one expandable member is disposed between the expander member and the substantially cylindrical member, the expander member further having an external surface operably configured so as to exert a radially directed force against the at least one expandable member, toward forcing the expandable member radially against the sealing member. The expander member may be preferably configured such that the amount of radially directed force increases as more of the expander member is inserted into the substantially cylindrical member.

In a preferred embodiment, the expander member has a first end and a second end, the second end being configured to be insertingly received by the substantially cylindrical member, the expander member further being generally cylindrical in nature, and having a diameter at the second end which is substantially less than the diameter elsewhere along the length of the expander member.

Preferably, the expander member and the at least one expandable member are operably configured such that the expander member, upon insertion into the sealing member, causes the first end of the at least one expandable member to undergo substantial radial movement, to in turn, exert radially directed force against the sealing member, while the second end of the at least one expandable member undergoes, during at least a part of the insertion, substantially no radial movement, relative thereto.

The apparatus further comprises means for interlocking the expandable means to the expander means, subsequent to insertion of the expander means into the sealing means, towards retention of the expander means in its inserted position, for facilitating retention of the apparatus in the hole being closed.

In an alternative embodiment of the invention, the expander member and the at least one expandable member are operably configured such that the expander member, upon insertion into the sealing member, causes the first end of the at least one expandable member to undergo substantial radial movement, to in turn, exert radially directed force against the sealing member, while the second end of the at least one expandable member also undergoes during at least a part of the insertion, some radial movement.

The invention further comprises a method for closing a non-regular, generally cylindrical hole in a wall, the hole having a longitudinal axis and a first end and a second end, the method comprising the steps of:

positioning a sealing member within a hole in a wall, the sealing member being capable of sealably filling surface irregularities along at least a portion of the inner circumferential surface of the hole;

the sealing member having a first end and a second end, the sealing member being further operably configured so as to be disposed within the hole such that the first end of the sealing member is disposed substantially adjacent the first end of the hole;

positioning an expandable member adjacent to at least a portion of the sealing member, the expandable member being operably configured to exert force radially against the sealing member, actuating the expandable member with an expander member, the expander member being operably associated with the expandable member, for selective actuation of the expandable member, following preliminary insertion of the apparatus into the hole to be closed, forcing the sealing member against the inner circumferential surface of the hole, with the expandable member, following actuation of the expandable member, the expandable member and the expander member being operably associated so as to cause substantially radially directed sealing force to be exerted against the sealing member.

The expandable member further may be operably configured to provide reinforcement of the sealing member for facilitating resistance to movement of the sealing member against differential pressure across the wall which would tend to cause ejection of the apparatus from the hole.

BEST MODE FOR CARRYING OUT THE INVENTION

Figure 1C:
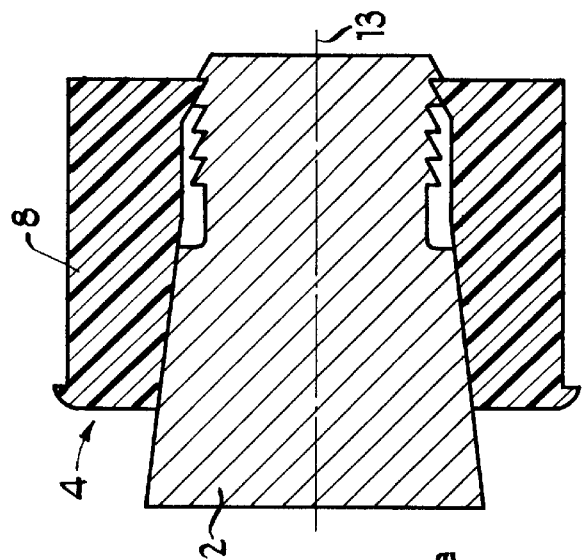
FIG. 1C is a longitudinal cross-sectional view of the plug assembly of FIG. 1A taken along line 1C—1C of FIG. 1A.

While this invention is susceptible of embodiment in may different forms, there is shown in the drawings and will be described herein in detail, a specific embodiment, with the understanding that the present invention is to be considered as an exemplification of the principles of the invention, and is not intended to limit the invention to the embodiment illustrated.

The present invention is a radially expandable, self-locking plug assembly suitable for high pressure sealing of loosely toleranced holes, such as the perforations produced through the wall of oilfield well casings to sample reservoir fluid and to measure formation pressures.

Figure 1B:
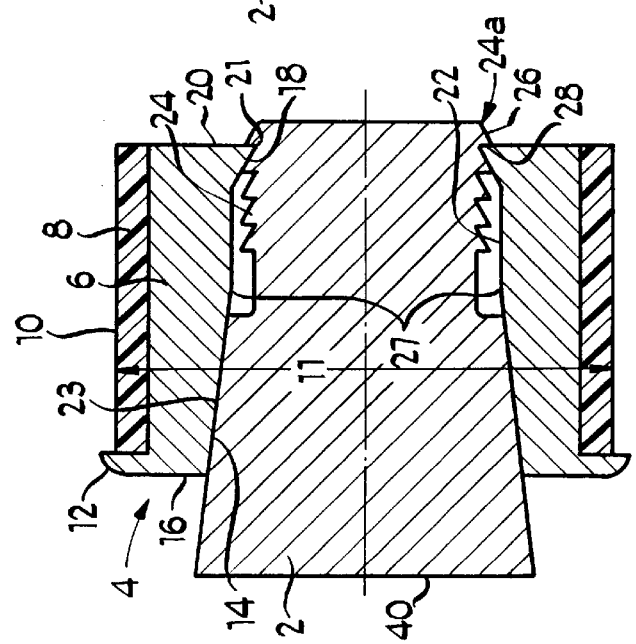
FIG. 1B is a longitudinal cross-sectional view of the plug assembly of FIG. 1A taken along line 1B—1B of FIG. 1A.
Figure 1A:
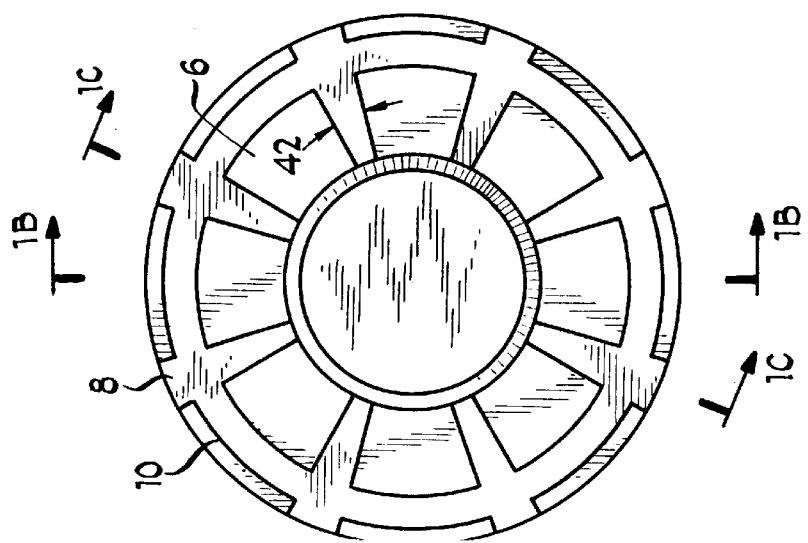
FIG. 1A is an end elevation of a plug assembly according to a preferred embodiment of the present invention.

Referring to the drawings, and specifically to FIGS. 1A, 1B, 1C, there is shown in FIG. 1A an end view of the plug assembly of the present invention, and there is shown in FIG. 1B a longitudinal cross-sectional view taken along cutting plane 1B—1B of FIG. 1A. There is also shown in FIG. 1C a longitudinal cross-sectional view taken along cutting plane 1C—1C. The plug assembly consists of an inner expander 2 and an outer expandable ring of composite construction shown generally at 4.

The outer expandable ring 4 incorporates a multiplicity of individual longitudinally oriented segments 6 which are made from a substantially rigid material such as metal. The individual segments 6 are substantially surrounded and held together by a resilient material 8 (such as an elastomeric material, although other resilient or deformable materials capable of creating a sealing contact with the inner surface of a perforation may be employed), which together with the segments 6 form a generally ring-like shape. Each segment 6 ends in a flanged rim 12, which, as may be perceived from FIGS. 1A, 1B and 1C, is arcuate in form, but does not extend in a continuous manner, to join adjacent segments 6 to one another. The resilient material 8 is attached to the substantially rigid segments 6 by bonding, which may be achieved during molding of the expandable material. The angular distance 42 between segments 6 is relatively small, when compared to the overall circumference of the plug assembly. The outer surface 10 of the expandable ring 4 is likewise formed from resilient material 8. The outer surface 10 has a generally cylindrical shape with a nominal, pre-installation, outer diameter 11 (exclusive the greatest outer diameter of opposed flanged rims 12). The inner periphery of the expandable ring 4, segments and resilient material alike, has a conically tapered inner surface 14 (the larger end of which terminates at generally planar face 16) and has a further conically tapered inner surface 18, the smaller end of which terminates at face 20, so as to form a radially inwardly projecting ledge. A generally cylindrical inner surface 22 is interposed between conical tapered surfaces 14 and 18.

The outer periphery of inner expander 2 has a conically tapered surface 23 which has a slope or conicity which is substantially the same as that of conically tapered internal surface 14 of the expandable ring 4, when the plug assembly is in its pre-installation configuration. Expander 2 also has a multiplicity of barbs 24 (as seen in cross-section in FIGS. 1C and 1B) formed by conically tapered surfaces 26 and intersecting surfaces 28 which may be formed so as to extend radially, perpendicular to the central longitudinal axis 13 of expander 2. As may be perceived, "barbs" 24 are, actually, ridges which are arcuately formed on the exterior surface of the rightmost (FIG. 1B) end of expander 2. The ridges extend about at least a portion of the circumference of the small end of expander 2, and preferably extend about a major portion if not the entire circumference of expander 2. Conically tapered surfaces 26 are therefore understood to be at least partially circumferentially extending conical surfaces, while intersecting surfaces 28 are, preferably, understood to be annular, at least partially circumferentially extending planar surfaces.

Prior to usage of the plug, expander 2 and expandable ring 4 are joined together to form the self-contained plug assembly depicted in FIGS. 1A, 1B, and 1C by inserting the inner expander 2 into the expandable ring 4. As the inner expander 2 is forcibly inserted into the expandable ring 4, the leading conical surface 26 of the leading barb 24a interacts with the inner conical surface 18 of the expandable ring. Under the force exerted by barb 24, as edge 21 slides radially outwardly along surface 26, the free ends of segments 6 deflect radially outwardly, in turn causing the resilient material 8 of the expandable ring 4 to expand diametrically, allowing passage of the first barb. After passage of the first barb, the free ends of segments 6, under the action of resilient material 8, "snap" back substantially to their original radial orientations relative to expander 2. The expandable ring 4 returns approximately to its original diameter 11, causing interlocking between surface 28 of the barb 24 and surface 20 of the expandable ring 4, and thereby interlocking expander 2 and expandable ring 4 together in self-contained assembly.

Figure 2:
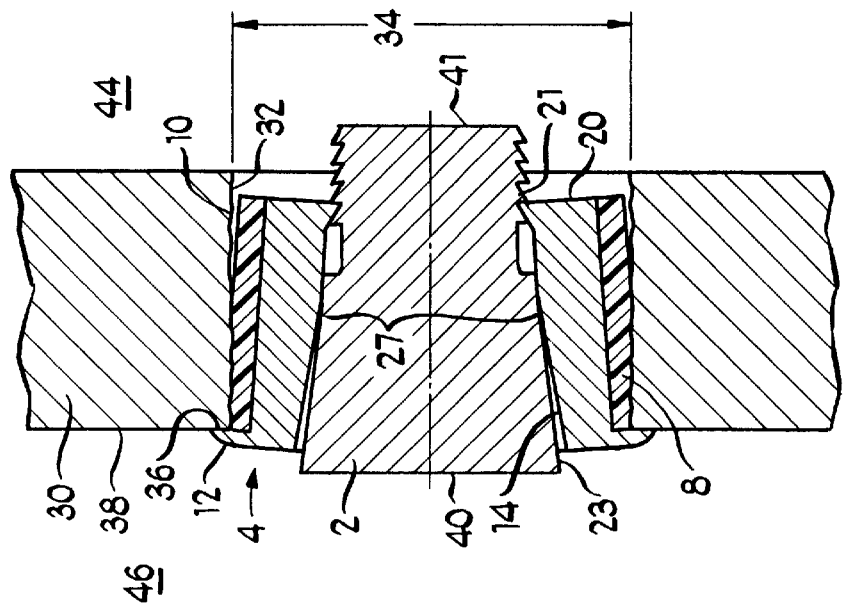
FIG. 2 is a cross-sectional illustration of the plug assembly of FIG. 1A in its installed configuration.

The expandable plug assembly of the present invention is shown in its installed configuration in the cross-sectional view of FIG. 2. A membrane 30, which may be a well hole casing wall, is shown which is penetrated by an irregular (i.e., not necessarily having a perfectly round circumference) hole 32 having a generally cylindrical shape of diameter 34, which is larger than or approximately the same size as previously defined diameter 11 of the plug assembly. The plug assembly therefore can be inserted freely until shoulder 36 of flanged rim 12 contacts and reacts against surface 38 of membrane 30 to prevent deeper insertion. Ramming force is then applied to surface 40 of expander 2 to force expander 2 deeper into expandable ring 4. Forcing expander 2 deeper into expandable ring 4 causes a wedging action between conical surface 23 of the expander and conical surface 14 of the expandable ring, in particular on the segment parts of expandable ring 4, which causes the flanged end of the expandable ring to expand, in particular the segment parts of expandable ring 4. The expansion results in contact between outer diameter 10 of the expandable ring and the bore of membrane hole 32, and causes a high level of radial compression of the resilient material 8 causing resilient material 8 to conform to the surface irregularities of membrane hole 32 and achieve a seal therewith, and also achieve a frictional purchase therewith to lock the expandable ring in place axially with respect to membrane 30. The wedging action between conical outer surface 23 of the expander and conical inner surface 14 of the expandable ring also results in sufficient interfacial contact force to achieve a seal between surfaces 14 and 23.

Installation of a plug assembly, such as illustrated in FIG. 2 may be accomplished by positioning a pre-installation plug assembly in a borehole or pipe, which is configured to extend more or less normally to the surface of the casing or membrane 30, in which the perforation is located, with the borehole or casing substantially is aligned with the perforation. A hydraulic ram member is positioned "behind" the plug assembly, so that the plug assembly is "between" the ram member and the casing. Hydraulic pressure is directed into the borehole or pipe, "behind" the ram member, and the hydraulic pressure causes the ram member to press against the plug assembly, until the plug assembly becomes inserted into the perforation. First, the plug assembly will be inserted into the perforation, to the limit created by the flanged rim (e.g., flanged rim 12). Thereafter, continued application of pressure will cause expander 2 to be driven further, relative to expandable ring 4, to cause the radial expansion of the "outer" end of expandable ring 4 (especially the segment portions), causing engagement of the resilient material with the inner edge of the circumference of the perforation, creating a fluid-tight and pressure resistant sealing of the perforation.

It is important that the diameter of expander 2 preferably undergo a discontinuous widening from face 41 to face 40, and preferably that the nominal diameter at the end generally in the vicinity of face 41 (excluding barbs 24) be approximately the same as the nominal inner "diameter" of the end of expandable ring 4 in that same region (not including edge 21), so that upon initial insertion of expander 2 into expandable ring 4, expander 2 does not cause appreciable expansion of ring 4, until contact occurs between the inclined surfaces 14 and 23. As insertion is continued, the individual segments 6 "pivot" relative to expander 2, about points of inflection 27, which occur where the slope of the inner surfaces of segments 6 have their discontinuity. Thereafter, those ends of segments 6 which are nearest the leftmost end of the hole (as illustrated) continue to expand, while, preferably, those ends of segments 6 which are nearest the right-most end of the hole, do not undergo expansion to any significant degree.

Forcing expander 2 into expandable ring 4 also causes the barbs 24 of expander 2 to achieve a new interlocking position with respect to surface 20 of the expandable ring, thereby locking the expander in position axially. Not shown, but readily perceivable to one of ordinary skill in the art having the present disclosure before them, is that the geometry employed for receiving the barbs of the expander can exist in a quantity greater than one to achieve greater retentive power. That is, a plurality of edges 21 may be provided, to provide a level of redundancy in the gripping of expandable ring 4 by expander 2.

Owing to the relatively small angle of conical taper of surfaces 14 and 23 and the relatively large localized forces being created by the wedging action, a "self-locking" taper effect is achieved which also frictionally locks the expander 2 in position axially relative to expandable ring 4. The force used to drive expander 2 into expandable ring causes firm contact between flanged rim 12, surface 36 and surface 38 of membrane 30, even if surface 38 of membrane 30 is of a generally cylindrical shape (such as the bore of an oilfield well casing).

Since the distance 42 between segments 6 is relatively small (as shown in FIG. 1A), and the bonded length between the segments and the resilient material is relatively long, the resilient material is effectively retained against differential pressure acting over the plug from one side of the membrane to the other side by the bond between the resilient material and the segments. Additionally when the pressure is higher on side 44 of membrane 30, the resilient material is partially supported by the rigid portions of flange 12 which are formed by segments 6.

Figure 3:
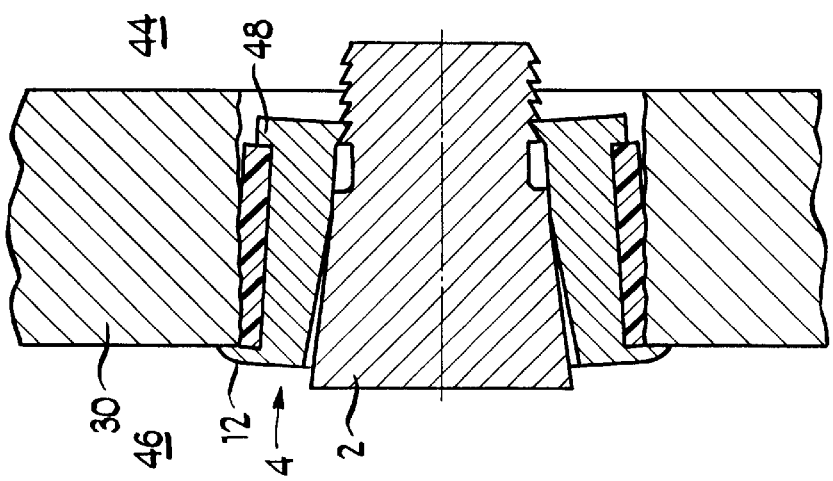
FIG. 3 is a further cross-sectional illustration of a plug assembly according to the present invention.

The embodiment of the invention shown in FIGS. 1A, 1B, and 1C and 2 is such that the flanged end of the expandable ring expands while the opposite ends of segments 6 do not substantially expand. The fact that the end of the expandable ring opposite flange 12 preferably does not expand can be exploited as shown by FIG. 3 to provide increased support for the resilient material between the segments. In FIG. 3, each segment 6 may be provided with a radially outwardly extending flange 48. Resilient material 8, in turn, will preferably be formed with a longitudinal length such that material 8 will fit longitudinally between flanged rim(s) 12 and flange 48.

Figure 4:
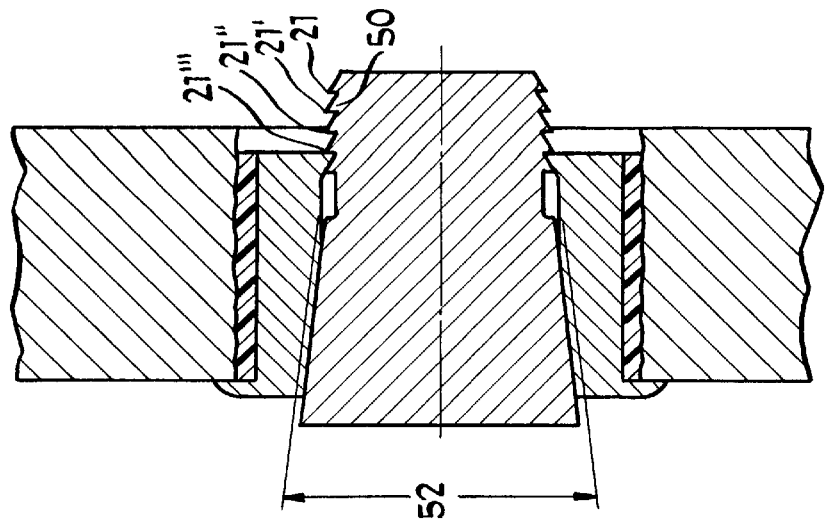
FIG. 4 is a cross-sectional illustration of an alternative embodiment of the plug assembly according to the present invention.

Alternatively, as shown in FIG. 4, the barbs 50 can gradually increase in diameter so that they together assume a conical angle 52 so that both the flanged end and the barb receiving end of the expandable ring expand simultaneously, thus causing compressing of the resilient material along the entire length of the expandable ring, as shown, and thereby achieving increased frictional purchase with the bore of the hole through the membrane. That is, each successive edge 21, 21', 21", 21'", etc. will be a greater radial distance away from the longitudinal axis of expander 2, than the edge to the right (as FIG. 4 is viewed). Although not shown, the segment surfaces in contact with the resilient material can also be textured or patterned to provide mechanical interlocking with the resilient material, in addition to the bonding previously mentioned.

Figure 5C:
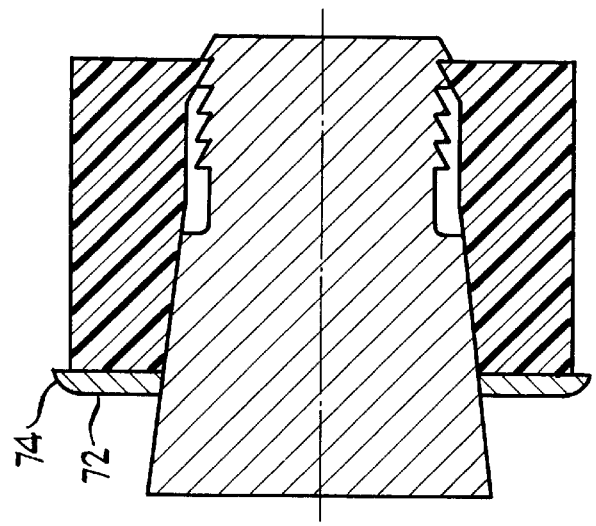
FIG. 5C is a longitudinal cross-sectional view of the plug assembly of FIG. 5A taken along line 5C—5C of FIG. 5A.
Figure 5B:
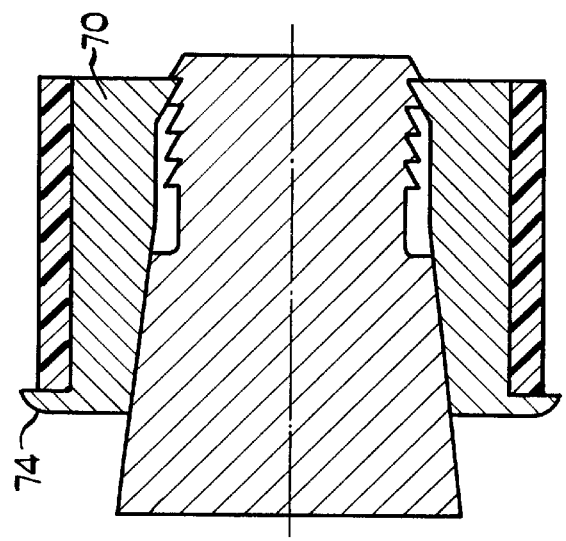
FIG. 5B is a longitudinal cross-sectional view of the plug assembly of FIG. 5A taken along line 5B—5B of FIG. 5A.
Figure 5A:
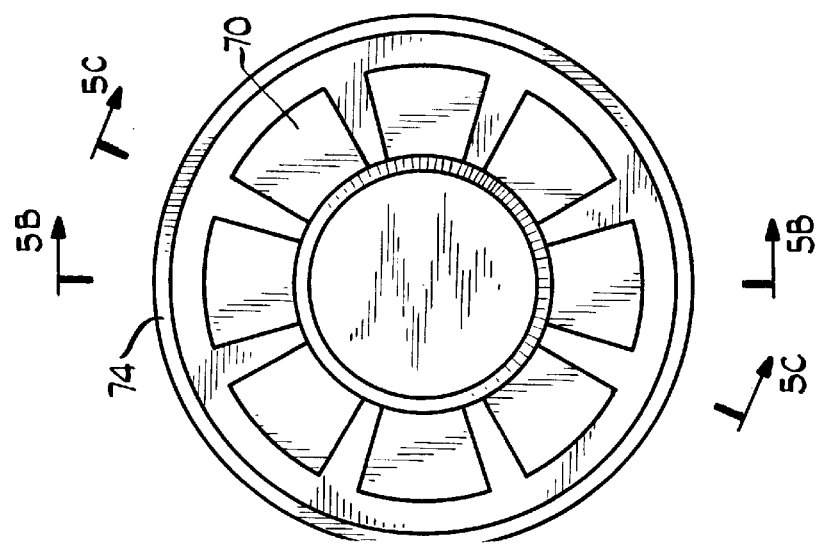
FIG. 5A is an end elevation of an alternative embodiment of the plug assembly of the present invention.

FIGS. 5A, 5B, and 5C show an alternative embodiment which is similar to the configuration shown in FIGS. 1A, 1B, 1C and 2 except that the segments 70 are integrally joined to thin ring 72, a portion of which forms flange 74. Accordingly, each segment 70 is mechanically connected by substantially rigid (e.g., metal) material, to adjacent segments 70. The purpose of the ring 72 is to provide increased support for the resilient material when exposed to differential pressure. The thin ring is operably configured to yield, possibly deformably, to permit expansion of the flanged end of the expandable ring. Alternatively, the ring may be radially split at one or more locations between segments so that yielding of the ring is not required, while still enabling radial expansion of the left most end of expandable member 4, upon forced insertion of expander 2.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

We claim:

1. An apparatus for closing a non-regular, generally cylindrical hole in a wall, the hole having a first end and a second end, the apparatus comprising:

means for sealably filling surface irregularities along at least a portion of the inner circumferential surface of a hole in a wall, the sealing means having a first end and a second end, the sealing means being further operably configured so as to be disposed within the hole such that the first end of the sealing means is disposed substantially adjacent the first end of the hole;

expandable means for forcing the sealing means against the inner circumferential surface of the hole, the expandable means being operably configured to exert force radially against the sealing means, expander means for actuating the expandable means, the expander means being operably associated with the expandable means, for selective actuation of the expandable means, following preliminary insertion of the apparatus into the hole to be closed, the expandable means and the expander means being operably associated so as to cause substantially radially directed sealing force to be exerted against the sealing means, means for interlocking the expandable means and the expander means in a desired orientation, the interlocking means comprising a plurality of barbs disposed on one of the expander means and the expandable means, and at least one mating conical portion disposed on the other of the expander means and the expandable means, wherein the cooperation of the plurality of barbs and the at least one conical portion serves to interlock the expandable means and the expander means in the desired relative orientation.

2. The apparatus according to claim 1, wherein the sealing means comprises:

a substantially cylindrical, generally tubular member, operably configured to be pressable, in at least a fluid-tight sealing manner, radially against the inner circumferential surface of a generally cylindrical hole.

3. The apparatus according to claim 2, wherein the expandable means comprises at least one expandable member operably disposed such that a portion of the substantially cylindrical member is positioned radially between a portion of the inner circumferential surface of the hole and the at least one expandable member, the at least one expandable member further being disposed so as to extend from a position substantially adjacent the first end of the sealing member, toward the second end of the sealing member, the at least one expandable member being operably configured such that upon the exertion of radially directed force upon the at least one expandable member, a portion of the at least one expandable member is caused to move radially, to, in turn, exert radially directed force against at least a portion of the sealing member, so as to force at least a portion of the sealing member against the inner circumferential surface of the hole.

4. The apparatus according to claim 3, wherein the at least one expandable member comprises a plurality of expandable members operably disposed such that a portion of the substantially cylindrical member is positioned radially between a portion of the inner circumferential surface of the hole and the expandable members.

5. The apparatus according to claim 3, wherein the at least one expandable member has a first end which is configured to be disposed substantially adjacent the respective first ends of the sealing member and of the hole, and a second end disposed at a position axially removed from the first end, toward the second end of the sealing member.

6. The apparatus according to claim 5, wherein the expander means comprises an expander member, operably configured to be forcibly inserted into the substantially cylindrical member, such that the at least one expandable member is disposed between the expander member and the substantially cylindrical member, the expander member further having an external surface operably configured so as to exert a radially directed force against the at least one expandable member, toward forcing the expandable member radially against the sealing member, the expander member being operably configured such that the amount of radially directed force increases as more of the expander member is inserted into the substantially cylindrical member.

7. The apparatus according to claim 6, wherein the expander member has a first end and a second end, the second end being configured to be insertingly received by the substantially cylindrical member, the expander member further being generally cylindrical in nature, and having a diameter at the second end which is substantially less than the diameter elsewhere along the length of the expander member.

8. The apparatus according to claim 6, wherein the expander member and the at least one expandable member are operably configured such that the expander member, upon insertion into the sealing member, causes the first end of the at least one expandable member to undergo substantial radial movement, to in turn, exert radially directed force against the sealing member, while the second end of the at least one expandable member undergoes during at least a part of the insertion, substantially no radial movement, relative thereto.

9. The apparatus according to claim 6, wherein the expander member and the at least one expandable member are operably configured such that the expander member, upon insertion into the sealing member, causes the first end of the at least one expandable member to undergo substantial radial movement, to in turn, exert radially directed force against the sealing member, while the second end of the at least one expandable member also undergoes during at least a part of the insertion, some radial movement.

10. The apparatus according to claim 1 wherein the expander means includes the plurality of barbs and the expandable means includes the at least one mating conical portion.

11. The apparatus according to claim 10 wherein:

the expander means comprises an expander member having a conical region wherein the plurality of barbs extend uniformly circumferentially around the conical region; and the expandable means includes a mating conical cavity wherein the at least one mating conical portion extends around an inner circumference of the conical cavity.

12. The apparatus according to claim 11 wherein the conical region and the conical cavity comprise a substantially cylindrical shape.

13. The apparatus according to claim 1 wherein the barbs include means for precluding movement of the expander means relative to the expandable means in a first direction and means for facilitating movement of the expander means relative to the expandable means in a second direction, wherein the second direction corresponds to further actuation of the expandable means.

14. A method for closing a non-regular, generally cylindrical hole in a wall, the hole having a longitudinal axis and a first end and a second end, the method comprising the steps of:

positioning a sealing member within a hole in a wall, the sealing member being capable of sealably filling surface irregularities along at least a portion of the inner circumferential surface of the hole;

the sealing member being further operably configured so as to be disposed within the hole such that the first end of the sealing member is disposed substantially adjacent the first end of the hole;

positioning an expandable member adjacent to at least a portion of the sealing member, the expandable member being operably configured to exert force radially against the sealing member, actuating the expandable member with an expander member, the expander member being operably associated with the expandable member, for selective actuation of the expandable member, following preliminary insertion of the apparatus into the hole to be closed, forcing the sealing member against the inner circumferential surface of the hole, with the expandable member, following actuation of the expandable member, the expandable member and the expander member being operably associated so as to exert substantially radially directed sealing force outwardly against the sealing member, and interlocking the expandable member and the expander member in a desired orientation, the expandable member including one of a plurality of barbs and at least one conical portion, and the expander member including the other of the plurality of barbs and the at least one conical portion, wherein the plurality of barbs interlocks with the at least one conical portion.

* * * * *